June 24, 1958 — A. BUCHI — 2,840,059
INTERNAL COMBUSTION ENGINES
Filed March 29, 1954 — 5 Sheets-Sheet 1

Inventor
A. Buchi
By
Wenderoth, Lind & Ponack
Attorneys

June 24, 1958 — A. BUCHI — 2,840,059
INTERNAL COMBUSTION ENGINES
Filed March 29, 1954 — 5 Sheets-Sheet 2

Inventor
A. Buchi
By Wenderoth, Lind & Ponack
Attorneys

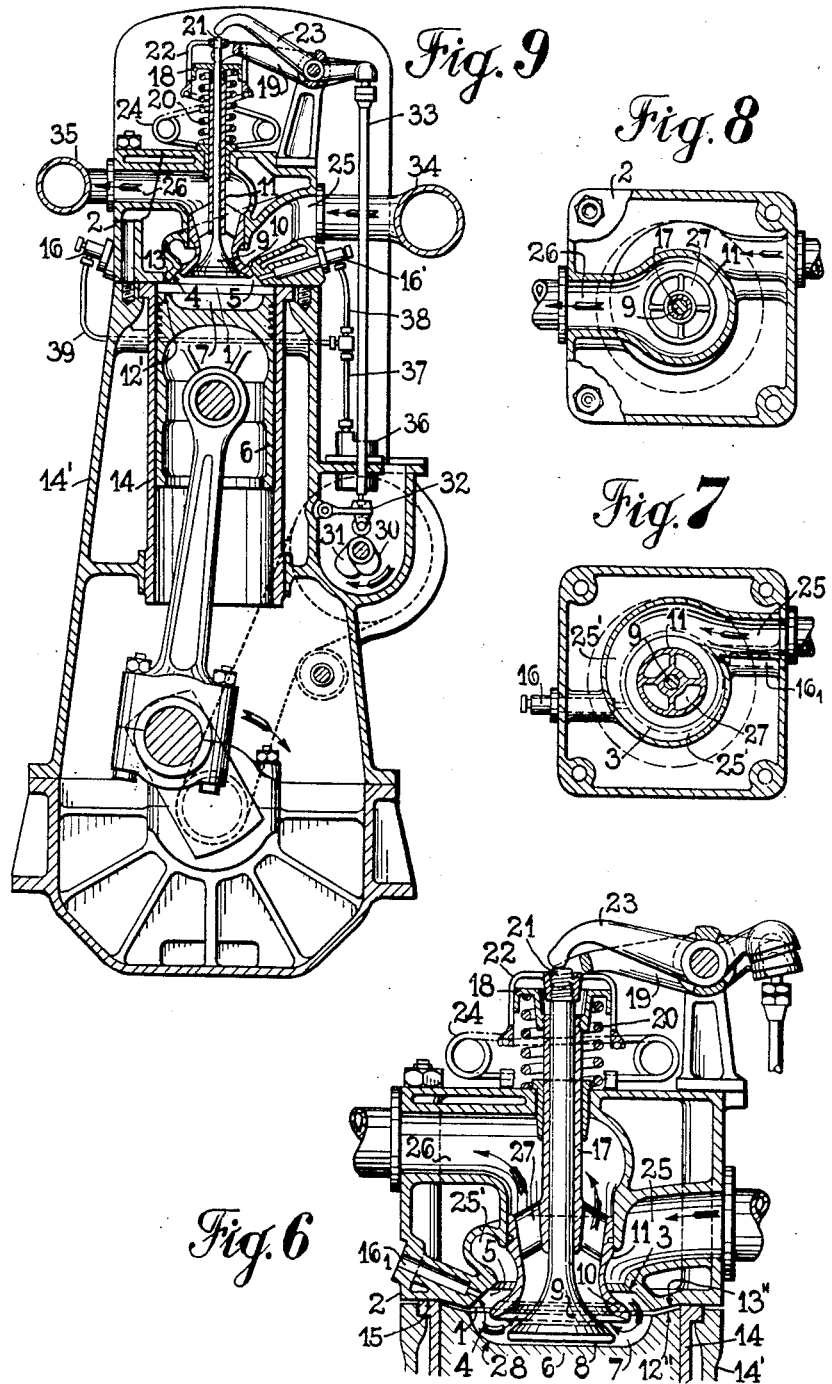

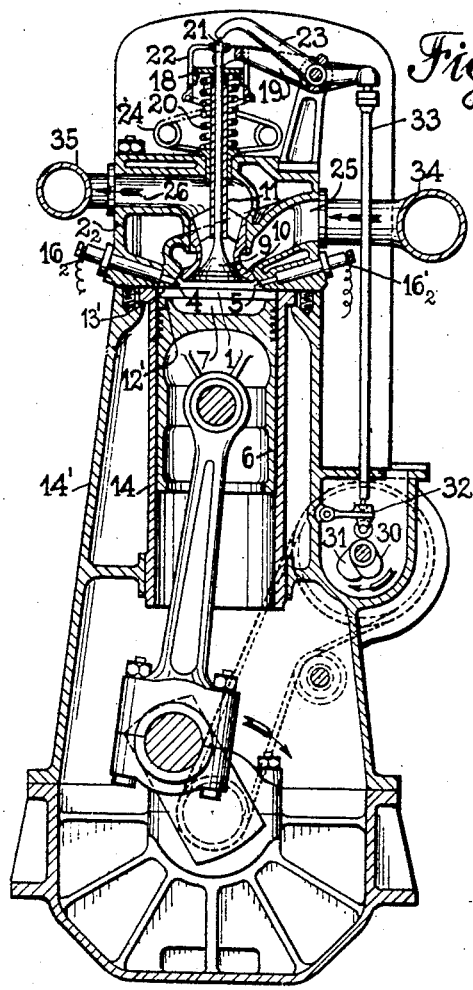

June 24, 1958     A. BUCHI     2,840,059
INTERNAL COMBUSTION ENGINES
Filed March 29, 1954     5 Sheets-Sheet 5
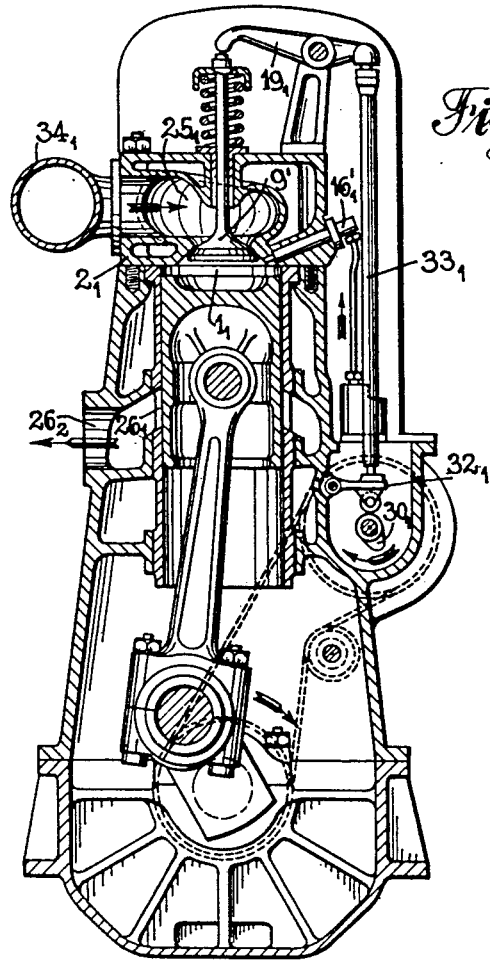
Fig. 12
Fig. 11
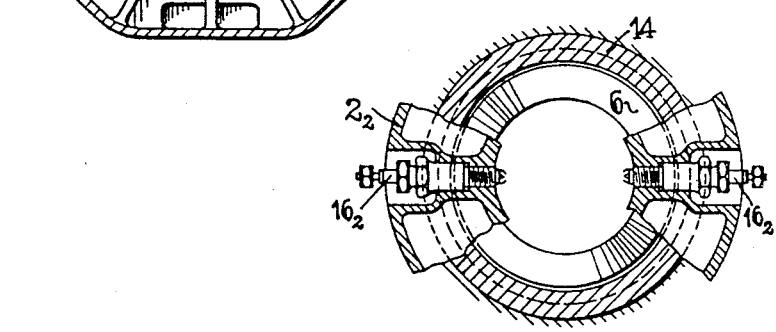
Inventor
A. Buchi
By
Wenderoth, Lind & Ponack
Attorneys

United States Patent Office 2,840,059
Patented June 24, 1958

2,840,059

INTERNAL COMBUSTION ENGINES

Alfred Buchi, Winterthur, Switzerland

Application March 29, 1954, Serial No. 419,395

Claims priority, application Switzerland July 6, 1949

17 Claims. (Cl. 123—32)

This invention relates to internal combustion engines in general, and particularly to such engines which are provided with a combustion space, whose circumferential wall is constricted as compared with the inner diameter of the cylinder wall itself, which combustion space is controlled with one inlet valve or a pair of concentric telescoping inlet and outlet controlling valves, as are described, by way of example, in my prior U. S. Letters Patent 2,213,202. This application is a continuation-in-part of application Serial No. 172,152 filed July 5, 1950, now abandoned.

It is an object of this invention to provide a more efficient combustion space of relatively greater depth and smaller diameter.

It is also an object of the present invention to provide a combustion space having a small defining surface in relation to its total volume to minimize the heat losses during all working strokes including the combustion period.

It is also an object to provide a special combustion space of such shape so as to provide for a satisfactory method of fuel injection.

It is a further object to provide a special combustion space and a fuel injection arrangement which permits excellent distribution of the fuel at any load and speed of the engine.

It is also an object to provide a combustion space arrangement and an arrangement of its controlling members so as to permit increased sectional flow areas for the inlet and exhaust media to and from the engine cylinders.

It is a further object to improve the scavenging of the cylinders of an internal combustion engine.

It is a further object to provide for increased valve opening areas during the scavenging periods of the cylinders without creating undesirable pockets in the pistons.

The foregoing and other objects are accomplished by the arrangements shown in the accompanying drawings in which:

Figs. 1 and 2 refer to a cylinder of an internal combustion engine formed with a combustion space according to the present invention. The figures illustrate also a preferable fuel injection disposition.

Fig. 2 is a cross-section along the lines II—II and III—III of Fig. 1.

The Figs. 3–6 inclusive illustrate various sections (along the cylinder axis) of my combustion space arrangement, and notably at different phases of the operating cycle in an internal combustion engine. Thus, Fig. 3 shows the combustion space and associated parts at the inlet stroke; Fig. 4 shows the same combustion space and parts during the combustion cycle at the outer dead center position of the piston; Fig. 5 shows the same space and parts at the outlet stroke; and Fig. 6 the same during the scavenging cycle.

Fig. 7 is a horizontal section along the line IV—IV, in Fig. 3.

Fig. 8 is a horizontal section along the line V—V, in Fig. 5.

Fig. 9 is a complete transverse vertical section along a cylinder axis of an engine incorporating an embodiment of my present invention.

Fig. 10 illustrates a section along the cylinder axis of my combustion space arrangement for a gasoline engine showing spark plug ignition of the four cycle type similar to Fig. 9.

Fig. 11 shows similar to Fig. 2, two partial sections illustrating the spark plug arrangement for a gasoline engine.

Fig. 12 is a section along the cylinder axis of a two stroke cycle internal combustion engine showing my combustion space arrangement.

Figure 1:
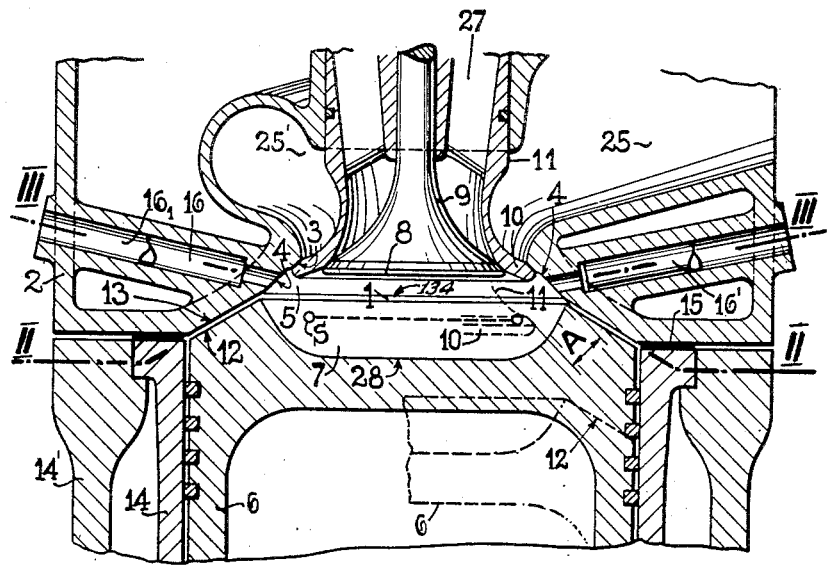
Figure 2:
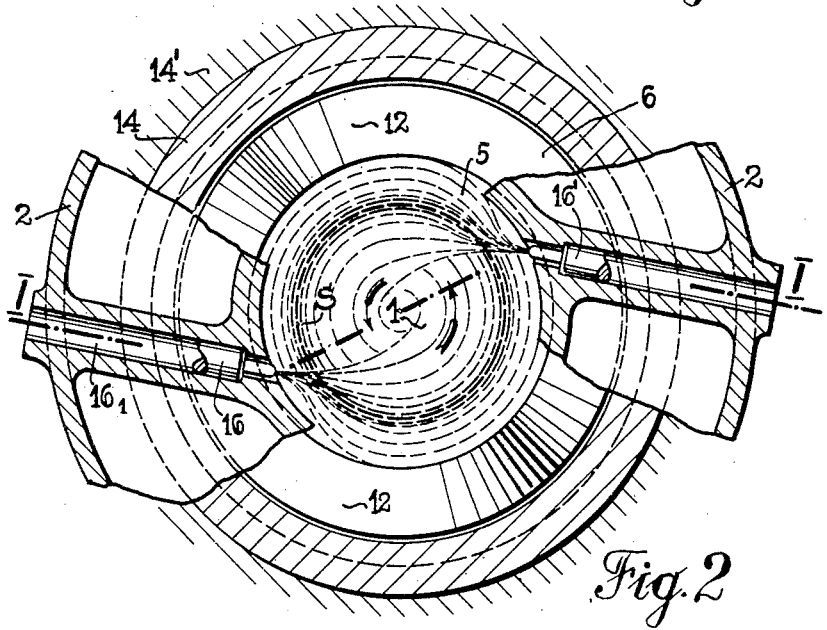

Referring to Figs. 1 and 2, numeral 1 indicates the combustion space in a cylinder of an internal combustion engine in which the piston is shown in its dead centre firing position. The combustion space 1 (Fig. 1) is partially defined by an upper roof-like conical wall surface 4 in the cylinder head 2, which surface adjoins the inlet valve seat 3, also in the cylinder head 2. The combustion space is thus partly formed by a depression 5 situated in the cylinder head itself. The valve seat 3 is disposed at a cone angle of approximately 45 degrees; the wall 4 of the depression 5 in the cylinder head 2 commences at the valve seat 3 and extends therefrom at approximately the same cone angle flaring outwardly up to a plane normal to the axis of the piston cylinder defining therein an open area of a smaller diameter than the diameter of the piston cylinder. The conical cylinder head wall 3 adjoining wall 4 extends outwardly in angular relation to wall 4 to the uppermost end of the piston cylinder. As shown in Fig. 1 this angular relation is determined by a considerably smaller cone-angle (measured against said normal plane) of the cylinder head wall 13 than the cone angle of approximately 45 degrees of the wall 4. In Fig. 1 this angle is shown to be approximately 30 degrees. Opposite to the depression 5 a circular cavity 7 is disposed in the piston 6. The uppermost diameter of the cavity 7 is approximately equal to the outermost diameter of the depression 5. The bottom 28 of the cavity 7 and the thereto opposed end 8 of the depression 5 are formed, as shown, by two parallel, circular areas. This feature provides for a minimum volume of the space between the valve disc 8 and the bottom 28 in the cavity 7. During the scavenging phase, when the piston is in its upper dead centre position and the valve 8 wide opened, the exhaust gases will be squeezed out of the combustion space to the maximum degree depending on the distance between the bottom 28 and the disc 8. Also no dead space is formed between such parallel areas, wherein burnt substances may be caught. The depth of the cavity 7 should be preferably such that the face-plate 8 of the outlet valve 9 may extend into the cavity 7 of the piston 6 when the valves 9 and 11 are opened wide and the piston is in its outer dead centre position. Likewise the cavity 7 should be of such contour that the face 10 of the inlet valve 11 (Fig. 6) may extend into the cavity 7. I prefer that the cavity 7 be of greater depth than the depression 5 in order that the greater part of the combustion space be formed in the piston head, to minimise heat losses as hereafter stated. That part 12 of the piston crown which lies above the level of the cavity 7 may be conically shaped, as shown in Fig. 1—the projected cone-point being situated above the piston in the cylinder head 2. The angular relation of the two walls 4 and 13 provides for the desired small axial depth of the depressed portion 5 in the cylinder head and also for a smaller height of the cylinder head and therewith of the engine generally though the desired optimal cone-angle of 45 degrees for the valve seat 3 and also the wall 4 of the combustion space is being maintained. This condition the change in flow direction of the gas at the transfer area from the gas duct 25 over to the combustion spaces or vice versa provides for considerable smaller flow losses in the respective gas streams as compared to construction where such angle would be considerably smaller. The provision whereby the conical wall 4 extends outwardly at the same cone angle as the valve seat permits the gas stream to flow along the wall 4 minimizing flow losses and providing for cooling it at scavenging of the combustion space. The piston crown itself comprises a mating conically shaped surface 12 which approaches the cylinder head surface 13, when the piston is situated in or near the outer dead center position, thereby to effect the squeezing of the air between the surfaces 12 and 13 inwardly towards the outlet openings of the fuel injectors and the valve face-plates 10 and 8. This effect is quite desirable during the compression and combustion stroke. The circular intersecting line between the conical surface 4 and the conical surface 13 upon the cylinder head is indicated at 134 in Fig. 1. The cylinder head surface 13 may also be constructed horizontal (Fig. 9), or conical in the other direction from that shown in Figs. 1 and 3 as indicated in Fig. 6; in each case the abutting piston crown portion 12' (Fig. 9) or 12" (Fig. 6) is mated accordingly. When the piston crown surface 12 is shaped conically as shown in Fig. 6, the projected cone point is situated inside the piston. In a construction according to Fig. 3, the open area of the cylinder head depression 5 is situated in a normal plane to the piston axis sub-dividing the cylinder head surface above the piston cylinder into the wall 4 of the combustion space 1 and the adjoining cylinder head surface 13 which extends from the constricted combustion space 1 to the upper end of the cylindrical sleeve 14 of the piston cylinder. In this instance said normal plane is positioned intermediate the valve seat 3 and the piston cylinder sleeve 14; while in a construction as shown in Fig. 6 such normal plane is situated below the upper end of the cylinder sleeve 14. In Fig. 9 such normal plane is positioned at the end of the cylindrical sleeve 14; in each instance the adjoining cylinder head surface 13' resp. 13" extends from the constricted combustion space 1 at different angle up to the end of the cylindrical sleeve 14. The outer valve seat 3, and hence both valves 9 and 11, the depression 5, the cavity 7 in the piston 6, and the opposing surface portions 12 and 13, are all substantially disposed symmetrically with the same axis, namely that of the piston and cylinder.

14 is the cylinder liner surrounding the piston, which liner is separated from the cylinder head 2 by a gasket or joint 15. The cylinder head 2 and the outer cylinder jacket 14' may be made integrally, and under certain circumstances 14' may be made integrally with the cylinder liner 14 also. The engine may be built with wet or dry liners. Ribs for air cooling may be provided instead of water cooling as shown in the drawing.

In Fig. 1 the valves 9 and 11 are shown in closed position in full lines. The outer valve 11 is also shown in open condition by the dotted lines in relation to the thereto corresponding position of the piston 6. This illustration also shows that the conically shaped surface 4 of the depression 5 in the cylinder head 2 is preferably made of such depth that in the open condition of the inlet valve a passage for the charging air is established in which the smallest through-flow area will be found to be disposed between the valve seat face area and the opposite wall surface 4.

Figs. 1 and 2 show an arrangement with two fuel injectors 16, 16' in the cylinder head 2. These injectors are positioned in relation to the axis of the combustion space 1 (seen both in horizontal and vertical directions in Figs. 1 and 2) in such manner that the injected fuel arrives equally spread out at points where the required portion of combustion air is present in the combustion space. Thus, from Figs. 1 and 2, it will be seen that I prefer the disposition of the fuel injection device or devices in such manner that the fuel is injected into the piston cavity 7 in a direction which is both transverse and oblique to the cylinder axis, and when a swirl effect is produced in the combustion space, the fuel injection device or devices are positioned so that the mean injection direction of the fuel passes to one side of the cylinder axis in the flow direction of the swirl movement. At least one fuel injection device 16, 16' is preferably arranged, to inject fuel into the combustion space, through the conical surface in the cylinder head, and the fuel injectors are so directed that the injected fuel passes laterally of the cylinder axis and tangentially to the direction of the swirl movement whereby the individual fuel particles are atomized, vaporized and converted into gas in the volume of air in the combustion space, and uniformly distributed therein. By such a swirl action the fuel particles injected are distributed, atomized, vaporized and converted into gas in the combustible air, preferably uniformly around the center of gravity circle of the combustion space. Furthermore, a plurality of fuel injection points or valves may be equally distributed around the combustion space and arranged in such manner that thereby a very uniform fuel oil distribution in the entire combustion space is obtained. At each injection point, devices with one or several fuel nozzle openings may be provided.

Figure 3:
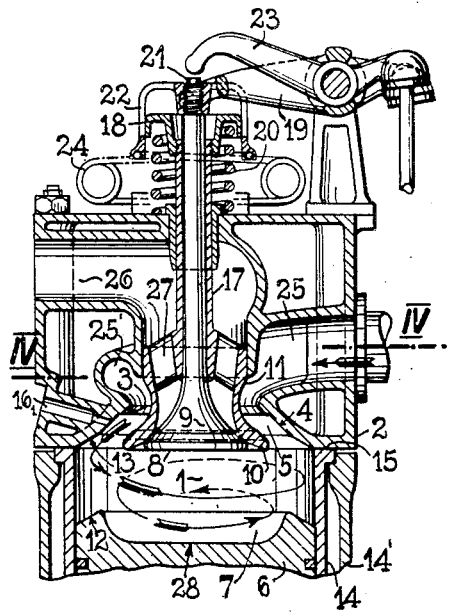

In Fig. 3 the inlet valve 11 is shown in open position and the outlet valve 9 in closed position. The inlet valve 11 is actuated by the lever 19 acting upon the spring washer 18. The latter is fastened to the guide sleeve 17 forming the valve stem which is urged upward by the cylindrical spring 20. Operation of the outlet valve 9 with its long valve stem 21 is, however, accomplished by the action of the valve lever 23 upon the spring washer 22 against the constant counter-pressure of torsion springs 24. In Fig. 3 may be seen the combustion space 1 with the depression 5 formed by the roof-like conical surface 4 beginning at the valve seat 3 in the cylinder head 2. The cavity 7 is disposed in the piston 6 opposite the depression 5. 14 is the cylinder liner surrounding the piston. The liner itself is surrounded by the engine frame 14'. The air-charge is led by the inlet duct 25 and its spiral type continuation 25' to the inlet valve seat 3. Due to the spiral type form of the duct 25' the air-charge is conveyed into the combustion space 1 with a tangential velocity component in the direction of the circumference of the liner 14, thereby creating in the said space a vigorous swirl indicated by the arrows. The swirl movement tends to improve the fuel distribution, the scavenging action and the cooling of the walls of the combustion space and the cylinder liner. Apertures 27 in the valve 11, and the outlet ducts 26 provide exhaust gas passages. $16_1$ is a bore for the fuel injecting device 16. A similar bore (not shown in Fig. 3) is provided for the other fuel injector 16'. (See Figs. 1 and 2).

Figure 4:
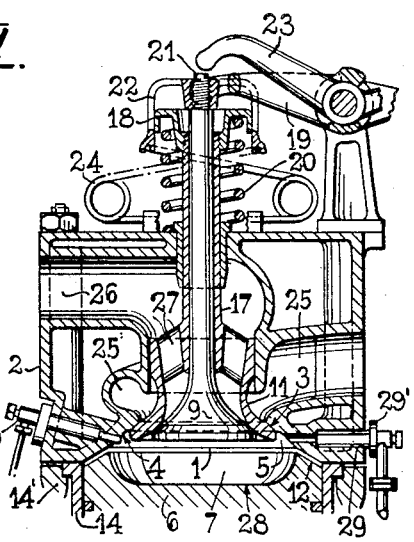

In Fig. 4 are seen in the closed condition both the air-charge valve 11, and the outlet or exhaust valve 9. The design as shown includes a central relatively deep or long combustion space 1 of an outside diameter which is smaller than the cylinder diameter. Only a small portion of the hot gases in the combustion space contacts the roof-like conical wall surface 4 of the cylinder head 2, while the greater portion contacts the wall surface 28 of the cavity 7 in the piston 6. Since there is generally poor heat transfer through a piston even where the piston is especially cooled, the piston wall surface 28 is cooled less effectively than the cooled cylinder head. Consequently, my combustion space arrangement reduces heat transfer towards cooler portions of the engine during combustion and expansion of the fuel, with the result that the heat losses are minimised. Moreover, since the fuel injection devices 16, 16' are fitted in the water-cooled cylinder head 2, and particularly when said devices enter the cylinder head through a boss or hub fully surrounded by the cooling water as shown in Figs. 1 and 2, efficient cooling of these devices is assured. This arrangement also enables these delicate parts to function well; and it will be found that difficulties will not arise with these fuel injection devices even when non-volatile fuel oil, which favours the formation of coke and soot, is employed.

The orifice 29 in the roof-like border portion of cylinder head 2 contains an air starting valve 29' by which compressed air, etc. for starting the engine is conducted into the cylinder space in a manner well known in the art.

Figure 5:
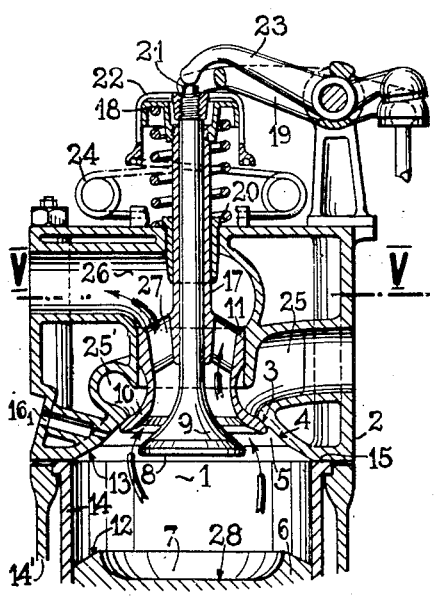

In Fig. 5 the exhaust valve 9 has been moved into its open position by the action of the valve lever 23. The exhaust gases are seen escaping from the combustion space 1 via openings 27 in the inlet valve body 11, into the exhaust connection 26.

Fig. 6 shows the position of the inlet valve 11 and the exhaust valve 9 during scavenging by use of compressed air. In this phase both the inlet valve 11 as well as the exhaust valve 9 are open. Scavenging air enters the combustion chamber by the spiral type housing 25, 25'. This air passes over the valve seat 3 and through the air charge and scavenging valve 11; thence it flows first along the wall surface 5 in the depression 5 in the cylinder head 2, and afterwards, along the wall 28 in the cavity 7 of the piston 6. The air then escapes through the opening of the exhaust valve 9 and into the exhaust duct 26. Due to the spiral type inlet duct 25' a strong swirl effect in the combustion space 1 is created, whereby the wall surface 4 and 28 of the combustion space and the valves 11 and 9, and particularly the portions 10 and 8 respectively of said valves which protrude into the combustion space 1 and into the scavenging air stream, are well cooled. The dimensions and shape of the walls 4 and 28 and the extent of the opening of both valves 9 and 11, are preferably such that, near dead centre position of the piston the scavenging air is blown through the scavenging space of U-shaped cross-section, from the inlet to the exhaust valves, notably with gradually varying velocity, preferably increasing towards the exhaust orifice. This feature provides for smaller pressure losses and also for better scavenging and cooling of the combustion space and the opposing faces of the piston and cylinder should preferably be of such shape and dimensions that, at least in the outer dead centre position of the piston 6, practically the whole combustion space 1 is scavenged by the scavenging air. To this end there must exist a minimum of free space between the faces 12" and 13" in this piston position. Moreover, there should also be a minimum clearance between the exhaust valve faceplate 8 and the opposite portion of the piston wall 28 during at least part of the air scavenging period.

The roof-like border surface 4 of the depression 5 in the cylinder head may also be so shaped and dimensioned with relation to the outer valve 11 that, the through-flow area between the valve seat for the inlet valve and the body of this valve is preferably at least equal to the through-flow area between the seat face of the inlet valve body and the said conical depression defining surface in the cylinder head.

In Fig. 6 the piston front 12" above the level of the cavity 7, is conically inclined towards the inside of the cylinder; the correspondingly directed cylinder head facing surface 13" is designed to provide only a slight separation from the opposite piston face 12", when the piston is in its outer dead centre position. With such a construction, as the piston moves up towards its dead centre position, the air between the surfaces 12" and 13" is squeezed towards the bottom 28 of the cavity in the piston.

Fig. 7 shows the inlet duct 25 and its spiral type extension 25'. This arrangement directs the new charge of air towards the seat 3 of the inlet valve 11, and gives the charge a tangential component of movement.

Fig. 8 shows the outlet duct 26 for the exhaust gases of the engine. After they are discharged from the combustion space 1 through the opening 27 in the inlet valve sleeve 17, the exhaust gases pass into the exhaust duct 26.

Fig. 9 shows in a cross-section the incorporation of the items of my present invention with the other parts of a conventional internal combustion engine. Thus, there may be seen piston 6 with its cavity 7, the cylinder head 2 with its conically shaped depression 5, and, in this case, a horizontally extending surface 13' opposite to a similarly extending piston 12'. 11 is the inlet and 9 the outlet valve in a telescoping arrangement, 25 is the inlet duct for the charge, and 26 the outlet duct for the discharge of the exhaust gases of the engine. The inlet or charge valve 11 is opened with the valve lever 19 and the outlet or exhaust valve 9, with the valve lever 23. Closing of these valves is accomplished by springs 20 and 24, respectively, abutting the washers 18 and 22 respectively. The actuation of the charge valve 11 and the outlet valve 9 is effected by means of cams 30 and 31 respectively. These cams move control levers 32, arranged one behind the other, which in turn, actuate push-rods 33 thereby to transfer the movement of the cams 30, 31 to the valve levers 19 and 23 respectively. 34 is the inlet manifold pipe for the charge, and 35, the exhaust manifold pipe of the engine. The fuel oil is supplied to the combustion space 1 by the injectors 16, 16' which are fed by the conduits 37, 38 and 39 leading from the fuel oil pump 36. While in the arrangement only one pump 36 is used to supply fuel to injectors 16, 16' via the conduits 39 and 38 respectively, a separate pump and separate supply lines for each fuel oil injection device 16, 16' may be used.

The Figs. 10 and 11 show the application of the new combustion space in a 4-stroke gasoline engine. Spark plugs are shown at $16_2$, replacing the injector nozzles. As shown in Fig. 11, the spark plugs are arranged in radial direction, intersecting with the axis of the combustion space. The fuel-air mixture enters into the combustion space by the cylinder head $2_2$, through the inlet manifold 34 and the spiral path 25 while the exhaust gases escape through 26 and the manifold 35. The piston crown is formed with a face 12' and the correspondingly directed cylinder head-facing is 13'. The faces 12' and 13' could be disposed also as shown at 12 and 13 (Fig. 1) or at 12" and 13" (Fig. 6). Other parts shown in Figure 10 are identical and as described and shown in connection with Figs. 3 and 9.

Fig. 12 is illustrative of the application of the new combustion space in a two stroke fuel injection internal combustion engine. $2_1$ is the cylinder head, 9' is the inlet valve and $16_1'$ is the fuel injector.

The air charge which is controlled by the valve 9' enters from the inlet pipe 34, by the cylinder head 2, over a spiral path 25, similar to that shown in Fig. 7, and produces a swirl effect in the cylinder space $1_1$ to clear it from the waste gas escaping through slots $26_1$ and the exhaust pipe $26_2$. The swirl effect is maintained for combustion as already described. A cam $30_1$ actuates the rocker $19_1$ through the members $32_1$ and $33_1$. Fig. 12 is also illustrative of the application of the new combustion space in a two stroke cycle gasoline engine, when the injector $16_1'$ is replaced by a spark plug $16_2$ (Fig. 11).

The remaining parts of the internal combustion engine seen in the accompanying illustrations are easily recognised and will be clearly understood by those persons possessing any knowledge of the art. A more detailed description of such other parts is considered wholly unnecessary.

It will be found that a combustion space arrangement constructed according to the foregoing teachings of my invention will be of relatively greater depth and smaller outer diameter than has heretofore been constructed. In diesel engines where small combustion spaces are particularly desirable, the advantage of my novel design is most important. Moreover, the greater portion of my described combustion space, when the piston is at its outer firing dead centre position, is defined by the walls of the piston cavity, with the result that heat losses are smaller than in an engine where the combustion space is more largely defined by the walls of the cooled cylinder head. This feature is likewise advantageous in diesel engine design. It should also be noted that my invention permits a desirable disposition of the fuel injection devices in the cooled cylinder head, and further causes an excellent distribution of the fuel at any load through the central wholly symmetrical swirl effect in the circular combustion space.

The swirl effect created by my invention operates as well upon that portion of the piston face which is elevated above the cavity until the firing dead centre position of the piston is reached.

The principles of my invention may also be applied to an engine in which the inside telescoping valve of a pair of coaxial valves serves as the inlet and the outside valve, the outlet. However, I prefer the opposite arrangement which I have illustrated and discussed above.

What I claim is:

1. In an internal combustion engine the combination comprising a cylinder, a piston for said cylinder, said cylinder having a cylindrical sleeve portion, a cylinder head covering said cylinder and piston, said cylinder head having a valve orifice disposed substantially concentrically with the axis of said cylinder, valve means for opening and closing said orifice, a frustro-conically shaped valve seat in said cylinder head for said valve means, said cylinder head having a frustro-conically shaped depression therein with a conical wall surface commencing at said valve seat and flaring outwardly toward the crown of said piston substantially at the same angle to a plane normal to the cylinder axis as the surface of said valve seat, a contiguous wall surface to said conical wall surface in said cylinder head, said conical wall surface forming a circular intersection line with said contiguous wall surface, said circular intersection line lying in a plane normal to the cylinder axis and forming the largest diameter of the combustion space when said piston is in upper dead center, said piston having a depressed area in the crown thereof forming a cavity, said cylinder head depression and said cavity when brought together substantially registering with one another, said contiguous wall surface of said cylinder head from said circular intersecting line continuing outwardly at a smaller angle to a plane normal to the cylinder axis towards the upper end of said cylindrical sleeve whereby a combustion space of smaller diameter than the diameter of said cylinder is formed.

2. In an internal combustion engine as set forth in claim 1 wherein said piston has a conical surface bordering said cavity in the crown thereof extending outwardly and said contiguous wall surface has a similar slope overlying said bordering conical surface so that when said piston moves towards its upper dead center the air is compressed between said bordering surface and said contiguous wall surface towards said depression in said cylinder head.

3. In an internal combustion engine the combination comprising a cylinder, a piston for said cylinder, said cylinder having a cylindrical sleeve portion, a cylinder head covering said cylinder and piston, said cylinder head having a valve orifice disposed substantially concentrically with the axis of said cylinder, valve means for opening and closing said orifice, a frustro-conically shaped valve seat in said cylinder head for said valve means, said cylinder head having a frustro-conically shaped depression therein with a conical wall surface commencing at said valve seat and flaring outwardly toward the crown of said piston substantially at the same angle to a plane normal to the cylinder axis as the surface of said valve seat, a contiguous wall surface to said conical wall surface in said cylinder head, said conical wall surface forming a circular intersection line with said contiguous wall surface, said circular intersection line lying in a plane normal to the cylinder axis and forming the largest diameter of the combustion space when said piston is in upper dead center, said piston having a depressed area in the crown thereof forming a cavity, said cylinder head depression and said cavity when brought together substantially registering with one another, said contiguous wall surface of said cylinder head from said circular intersecting line continuing outwardly at an angle to a plane normal to the cylinder axis towards the upper end of said cylindrical sleeve whereby a combustion space of smaller diameter than the diameter of said cylinder is formed and the side wall of the frustro-conically shaped depression in the cylinder head has an opening for an inlet air valve.

4. In an internal combustion engine the combination comprising a cylinder, a piston for said cylinder, said cylinder having a cylindrical sleeve portion, a cylinder head covering said cylinder and piston, said cylinder head having a valve orifice disposed substantially concentrically with the axis of said cylinder, valve means for opening and closing said orifice, a frustro-conically shaped valve seat in said cylinder head for said valve means, said cylinder head having a frustro-conically shaped depression therein with a conical wall surface commencing at said valve seat and flaring outwardly toward the crown of said piston substantially at the same angle to a plane normal to the cylinder axis as the surface of said valve seat, a contiguous wall surface to said conical wall surface in said cylinder head, said conical wall surface forming a circular intersection line with said contiguous wall surface, said circular intersection line lying in a plane normal to the cylinder axis and forming the largest diameter of the combustion space when said piston is in upper dead center, said piston having a depressed area in the crown thereof forming a cavity, said cylinder head depression and said cavity when brought together substantially registering with one another, said contiguous wall surface of said cylinder head from said circular intersecting line continuing outwardly at an angle to a plane normal to the cylinder axis towards the upper end of said cylindrical sleeve whereby a combustion space of smaller diameter than the diameter of said cylinder is formed and said contiguous wall surface lying in a plane normal to the cylinder axis.

5. In an internal combustion engine the combination comprising a cylinder, a piston for said cylinder, said cylinder having a cylindrical sleeve portion, a cylinder head covering said cylinder and piston, said cylinder head having a valve orifice disposed substantially concentrically with the axis of said cylinder, valve means for opening and closing said orifice, a frustro-conically shaped valve seat in said cylinder head for said valve means, said cylinder head having a frustro-conically shaped depression therein with a conical wall surface commencing at said valve seat and flaring outwardly toward the crown of said piston substantially at the same angle to a plane normal to the cylinder axis as the surface of said valve seat, a contiguous wall surface to said conical wall surface in said cylinder head, said conical wall surface forming a circular intersection line with said contiguous wall surface, said circular intersection line lying in a plane normal to the cylinder axis and forming the largest diameter of the combustion space when said piston is in upper dead center, said piston having a depressed area in the crown thereof forming a cavity, said cylinder head depression and said cavity when brought together substantially registering with one another, said contiguous wall surface of said cylinder head from said circular intersecting line continuing outwardly at an angle to a plane normal to the cylinder axis towards the upper end of said cylindrical sleeve whereby a combustion space of smaller diameter than the diameter of said cylinder is formed, said contiguous wall surface being of conical shape flaring away from that piston crown when the piston is in its upper dead center.

6. In an internal combustion engine as set forth in claim 4 wherein said piston has a surface bordering said cavity in the crown thereof extending outwardly in a plane normal to the cylinder axis and said contiguous wall surface overlying said bordering surface.

7. In an internal combustion engine as set forth in claim 5 wherein said piston has a conical surface bordering said cavity in the crown thereof extending and flaring outwardly towards the cylinder head and said contiguous wall surface has a similar slope overlying said bordering conical surface so that when that piston moves towards its upper dead center the air is compressed between said bordering surface and said contiguous wall surface towards the cavity in that piston.

8. In an internal combustion engine the combination comprising a cylinder, a piston for said cylinder, said cylinder having a cylindrical sleeve portion, a cylinder head covering said cylinder and piston, said cylinder head having a valve orifice disposed substantially concentrically with the axis of said cylinder, valve means for opening and closing said orifice, a frustro-conically shaped valve seat in said cylinder head for said valve means, said cylinder head having a frustro-conically shaped depression therein with a conical wall surface commencing at said valve seat and flaring outwardly toward the crown of said piston substantially at the same angle to a plane normal to the cylinder axis as the surface of said valve seat, a contiguous wall surface to said conical wall surface in said cylinder head, said conical wall surface forming a circular intersection line with said contiguous wall surface, said circular intersection line lying in a plane normal to the cylinder axis and forming the largest diameter of the combustion space when said piston is in upper dead center, said piston having a depressed area in the crown thereof forming a cavity, said cylinder head depression and said cavity when brought together substantially registering with one another, said contiguous wall surface of said cylinder head from said circular intersecting line continuing outwardly at an angle to a plane normal to the cylinder axis towards the upper end of said cylindrical sleeve whereby a combustion space of smaller diameter than the diameter of said cylinder is formed and wherein two coaxial telescoping valves are provided for the inlet of air and the outlet of exhaust gases so that when said valves are opened and said piston is located in the upper dead center the valve seat of the inner valve is located in said cavity of said piston and is adjacent the bottom surface of said cavity.

9. In an internal combustion engine as set forth in claim 8 wherein said cavity in said piston has a greater depth than the depth of said depression in said cylinder head.

10. In an internal combustion engine as set forth in claim 8 wherein a spiral shaped air inlet channel is provided for the creation of a whirlpool movement of the incoming air and fuel injection jets are positioned laterally around the cylinder axis and have their axes turned towards the bottom of said cavity whereby the fuel is injected substantially in the direction of the whirlpool movement of the air in the combustion space.

11. In an internal combustion engine as set forth in claim 8 wherein said frustro-conically shaped valve seat makes an angle of approximately 45° with a plane normal to the cylindrical axis.

12. In an internal combustion engine according to claim 8 wherein said depression in said cylinder head is so formed that upon opening of the inlet valve there is formed between the valve seat therefor and said conical wall surface a perpendicular space which is smaller than the space between this position of the valve seat and the seating surface therefor upon said cylinder head.

13. In an internal combustion engine as set forth in claim 8, wherein said depression in the cylinder head and the said cavity in the piston crown are of such contours and dimensions relative to the heads of said valves that when both valves are open and the cylinder is being scavenged, the scavenging air, in flowing into and through the combustion space, is confined in a passage, viewed in a section taken through the cylinder axis and formed by the defining surfaces of the combustion space and the said valve heads is substantially U-shaped, said scavenging air thereafter flowing from the combustion space through the outlet valve opening.

14. In an internal combustion engine as set forth in claim 8, wherein the contours and dimensions of the said depression, said cavity and said valves are so related to each other that, when the valves are both open during the scavenging of the cylinder, the scavenging air flows from the inlet to the outlet of the combustion space at only a gradually varying velocity increasing towards the exhaust valve outlet.

15. In an internal combustion engine as set forth in claim 8 wherein said depression is of such angle and dimension that in the open position of the inlet valve, a through-flow area is created between the last said surface and the valve seat for the inlet valve and the body of the last mentioned valve is preferably at least as great as the through flow area between the seat face of the inlet valve and the said depression in the cylinder head.

16. In an internal combustion engine according to claim 8 wherein passage means are provided through which the air is admitted through the inlet valve in such manner that a swirl effect is produced in the combustion space itself, and at least one fuel injection device is arranged to inject fuel into the combustion space through the conical surface in the cylinder head, said injection device being so directed that the injected fuel passes into the piston cavity laterally of the cylinder axis and tangentially to the direction of the swirl movement, whereby the individual fuel particles are atomized, vaporized and converted into gas in the combustion space and uniformly distributed therein.

17. In an internal combustion engine according to claim 8 wherein a plurality of fuel injection devices are disposed in the cylinder head, each at a point equidistant from the next adjacent injection device, to inject fuel into the combustion space through the conical wall surface in the cylinder head thereby producing a uniform fuel distribution in said combustion space.

References Cited in the file of this patent

UNITED STATES PATENTS

| | | |
|---|---|---|
| 1,880,531 | Thaheld | Oct. 4, 1932 |
| 1,945,818 | McPherson et al. | Feb. 6, 1934 |
| 2,213,202 | Buchi | Sept. 3, 1940 |